Figure 1:
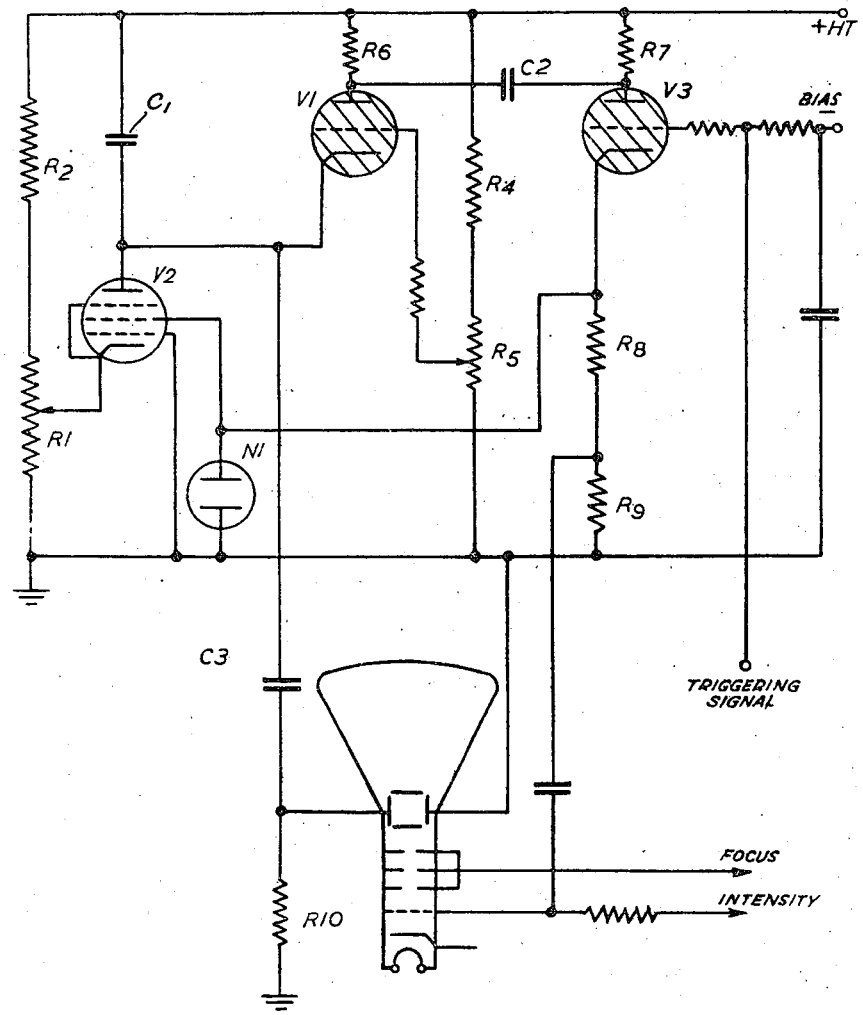

July 26, 1949.  R. HILTON  2,476,978
TIME BASE CIRCUIT FOR CATHODE-RAY TUBES
Filed Feb. 19, 1945  2 Sheets-Sheet 1

Inventor
Roy Hilton
By
Edward W. Turner
Attorney

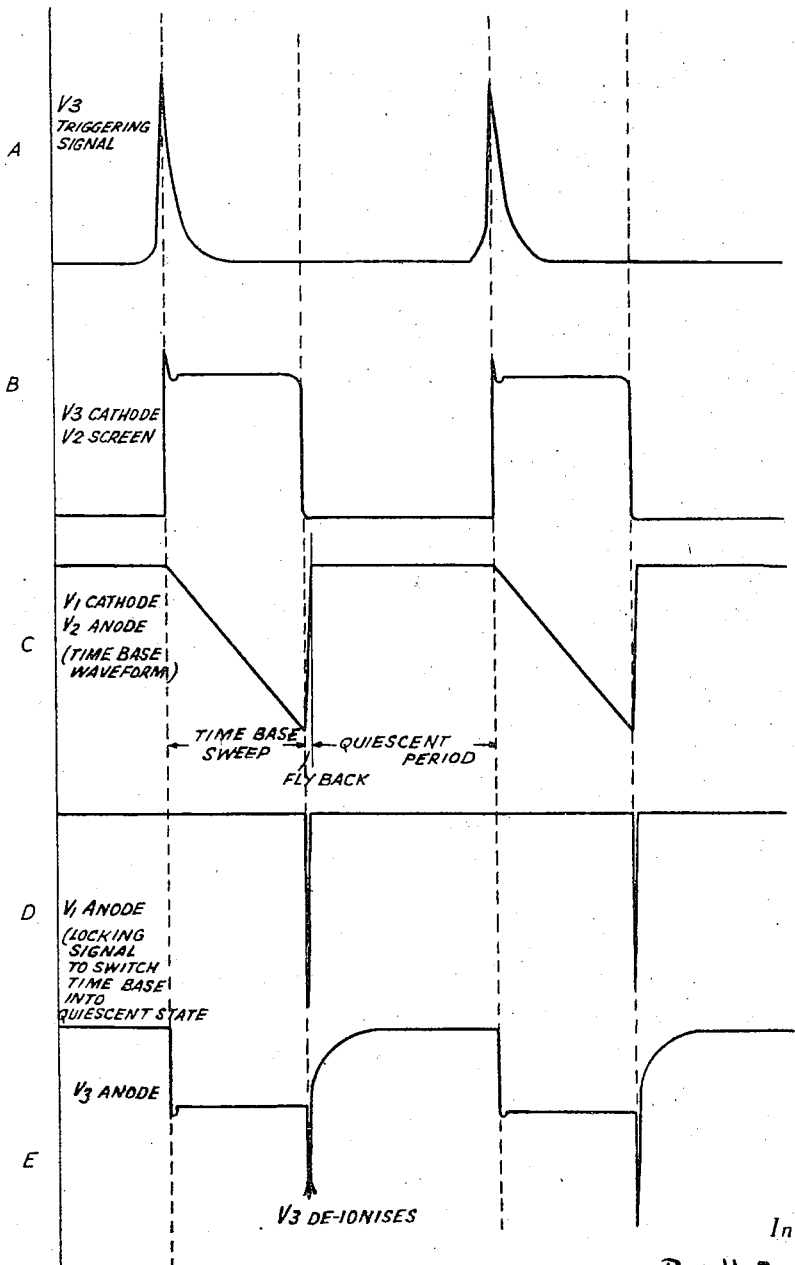

Patented July 26, 1949

2,476,978

UNITED STATES PATENT OFFICE 2,476,978

TIME BASE CIRCUIT FOR CATHODE-RAY TUBES

Roy Hilton, London, England, assignor, by mesne assignments, to International Standard Electric Corporation, New York, N. Y., a corporation of Delaware Application February 19, 1945, Serial No. 578,744
In Great Britain February 3, 1944

8 Claims. (Cl. 315—22)

This invention relates to time-base circuits for the production of saw-toothed impulses, that is impulses consisting of a slow stroke or sweep and a quick stroke or return; and more particularly to trigger-operated time-base circuits, that is to say time-base circuits in which a single saw-toothed pulse is produced in response to a stimulus. Such circuits are already known and have been used in connection with oscillographs for producing a time-base deflection and in television equipment for controlling a scanning device. In such uses the impulse in the form of a voltage is applied across the X-plates of a cathode-ray tube so that the luminous spot on the screen is made to travel in one sense at a slow uniform rate and in the opposite sense at a rate that is made as quick as possible.

An object of the invention is to reduce as much as possible the time delay between the reception of a stimulus and the commencement of the slow stroke or sweep.

Another object of the invention is to provide a time-base circuit that is so fast in its response to a stimulus that when used in conjunction with an oscilloscope the stimulus can be provided by the wave-front of the signal that is to be observed during the sweep of the impulse so stimulated.

In actual embodiments of the invention the delay between triggering and the commencement of the sweep has been reduced to something of the order of one microsecond, and has had a maximum value of about ten microseconds. The necessity of providing a stimulating signal in advance of the signal to be observed is thus avoided. Also, if the triggering pulse is required as a reference point, this point is located within about 1 microsecond at the beginning of the sweep.

It is to be further noted that a circuit in accordance with the present invention can provide a sweep duration which is quite independent of the duration of the triggering pulse. The commencement of the sweep is determined by the front of the triggering signal, whilst the end of the sweep is determined purely by the constants in the condenser charging circuit and the presetting of a discharge device across the condenser. This means that several cycles or part of a cycle can be observed simply by the operation of a single control always retaining the triggering front at the beginning of the sweep. If the sweep duration is longer than the time between successive triggering pulses, i. e. when more than 1 cycle is seen on the cathode ray tube screen, the triggering pulses occurring during the sweep do not affect the time base in any way.

The description that now follows relates to the accompanying drawing in which:

Fig. 1 shows the basic circuit diagram of a trigger-operated time-base circuit in accordance with the present invention; and Fig. 2 shows a number of explanatory oscillograms.

Consider first the circuit shown as the left-hand side of Fig. 1 and consisting of pentode $V_2$ and condenser $C_1$, connected in parallel with potentiometer $R_2$, $R_1$ between $+HT$ and earth. The pentode $V_2$ is a device permitting flow of electricity through itself at a constant rate which is dependent primarily upon its control-grid and screen-grid voltages and is substantially independent of its anode voltage. Being in series with the condenser $C_1$, the pentode $V_2$ permits the condenser to be charged up at a steady rate, its lower pole becoming increasingly negative with respect to its upper pole. The rate of such change is determined by the setting of the cathode voltage upon the potentiometer $R_2$, $R_1$, making the control grid of the pentode more or less negative with respect to the cathode. The time-base sweep control voltage is taken off from the anode of $V_2$, so that this voltage starts, if the condenser is completely discharged, from the value $+HT$, and steadily falls away. Thus it provides a change in voltage, linear with time, which when applied to the horizontal deflecting plates of a cathode ray tube, causes the electron beam to move across the screen equal distances in equal times.

This then is the part of the circuit by which a charge is steadily built up on the condenser $C_1$; next is to be described the means by which the condenser is discharged suddenly. This is provided for by the circuit consisting of trigger-tube $V_1$ and resistance $R_3$ shunted in series with one another across the condenser $C_1$. The valve $V_1$ is a gas-filled triode, such that the gas therein ionises when the anode reaches a certain critical voltage positive with respect to the cathode; this critical voltage is predetermined by the setting of the grid voltage relative to the cathode as provided for by the potentiometer $R_4$, $R_5$. When the condenser $C_1$ has charged up to this critical voltage, the tube $V_1$ fires and provides a very easy discharge path for the condenser.

As now described, then, the circuit if appropriately energised will function somewhat in the manner of an oscillation generator to produce a continuous succession of saw-tooth pulses. It is desired however to trigger-operate the circuit so that the circuit will go through one complete cycle in response to a stimulus, and moreover to have a very fast response, so fast that the stimulus may be provided by the very signal that is to be observed. This trigger-mechanism will therefore now be described: it consists of a second gas-filled triode $V_3$, with associated resistances $R_7$, $R_8$, $R_9$, and condenser $C_2$. The resistance $R_7$, valve $V_3$, and resistance $R_8$ and $R_9$ are arranged in series across the high-tension supply: the valve $V_3$ has its anode connected to the anode of $V_1$ over condenser $C_2$ and has its cathode directly connected to the screen of the pentode $V_2$. The grid of $V_3$ has a certain bias on it, while also being connected to receive the triggering signal. The bias is so great that even with the full H. T. potential between anode and cathode no discharge occurs. Consequently, when the time base is switched on, valve $V_3$ does not conduct, and the screen of the pentode $V_2$ is kept at earth potential. It is a feature of the pentode valve that the anode current depends upon the screen-grid voltage, and in the conditions described, with the screen at earth potential, no current flows through the pentode $V_2$ and the condenser $C_1$ does not charge. This means that the anode of $V_2$ will remain at a certain high positive potential which depends, actually, upon the ratio between the capacitances or, after a short period, upon the ratio of the insulation resistances of the two condensers $C_1$ and $C_3$ which are in series across the H. T. supply.

If now there comes over the triggering signal lead a positive pulse of sufficient amplitude, this pulse on application to the grid of $V_3$ will cause ionisation to occur, so that the valve becomes conducting as between its anode and cathode and will remain conducting after the triggering signal has ceased. The flow of current in the circuit $R_7$, $V_3$, $R_8$, $R_9$ raises the potential of the screen of valve $V_2$ abruptly to a positive value such that current begins to flow through the pentode $V_2$, charging the condenser $C_1$. Eventually the condenser $C_1$ reaches the critical voltage and fires tube $V_1$ to cause an instantaneous discharge of the condenser $C_1$. When this happens there is a sudden drop in voltage at the anode of $V_1$, and this drop is applied over condenser $C_2$ to the anode of $V_3$, quenching the latter. The positive potential on the screen of $V_2$ is thus removed, and the time-base circuit is locked inoperative with the condenser $C_1$ discharged to the extinguishing voltage of $V_1$.

A neon stabiliser $N_1$ is shown connected across the screen-grid input circuit of the pentode $V_2$. This limits the value of the positive voltage applied to the screen, and in particular serves to minimise the effect upon the screen voltage of the charging current that flows into condenser $C_2$ immediately upon firing of valve $V_3$. The existence of this momentary charging current means that for that short time the current through resistances $R_8$ and $R_9$ is greater than normal and the voltage across them is correspondingly higher. If this voltage is applied to the screen of the charging pentode, the rate of charge of the sweep condenser will be increased for an instant at the beginning of the sweep, with a consequent speeding up of the time-base. The neon cannot deal with the initial front of this pulse of voltage but it reduces the duration of the pulse to a value which makes its effect on the time-base almost negligible.

It will thus be seen as one of the features of this circuit that there is a very small delay between triggering and commencement of the time-base sweep on the cathode ray tube, as no time is lost in discharging condenser $C_1$ before commencing to charge it. Such delay as there is depends upon the time taken for the gas-filled tube $V_3$ to ionise. This varies with the type of gas and the amplitude of triggering pulse. Using a helium-filled triode, delays of a fraction of a microsecond are possible, and the delay is never likely to be more than 10 microseconds.

In Fig. 2 is shown a set of oscillograms showing the voltage at various points in the circuit during a condition of working such that the triggering period is greater than the sweep period:

Oscillogram A shows the form of a typical triggering signal arriving over the triggering-signal lead and appearing at that end of the resistance remote from the grid of tube $V_3$;

Oscillogram B shows the resultant voltage wave-form generated at the cathode of the triggering tube $V_3$ and directly applied to the screen grid of the pentode $V_2$;

Oscillogram C shows the time-base voltage variation at the anode of the pentode $V_2$; the flyback time after the discharge tube $V_1$ has ionised is short, but not infinitesimal;

Oscillogram D shows the sudden drop in the anode voltage of said discharge tube $V_1$ during this flyback period; and finally Oscillogram E shows the anode voltage of tube $V_3$ which voltage suddenly drops at the beginning of the sweep, i. e. when tube $V_3$ starts to conduct, and remains at this new low value throughout the sweep until a kick from the anode of $V_1$ causes it to drop still further and to extinguish the tube; the voltage then begins to rise very quickly, but is prevented from reaching its full H. T. supply voltage instantaneously by reason of the charge on the coupling condenser $C_2$. An exponential rise occurs after a certain potential has been reached, and the circuit remains quiescent until the next triggering signal occurs and the cycle repeats. A small downward loop at the beginning of the sweep appears to be due to the neon voltage dropping below its normal working value immediately after striking.

It has been found that sometimes there has occurred a small sweep, exponential in form, before commencement of the triggered sweep. This has been found to be due to the charging of the condenser $C_1$ through the coupling condenser $C_3$ and the resistance $R_{10}$ which performs the function of a leak on the plates of the cathode ray tube or on the grid of the first valve of an amplifier. It would be especially noticeable if the time-base were writing at a high speed and triggering were at a low speed, i. e. when there is a comparatively large period during which the time-base proper is inoperative. During this period unless black-out precautions were taken there would be a confused oscillogram of the signal applied to the Y deflector plates up to the beginning of the sweep proper. It is therefore desirable to apply intensity modulation to the grid of the cathode ray tube, and a convenient signal for this purpose can be obtained from the resistance $R_9$ in series with $V_3$ cathode. Normally the intensity control can be set so that no illumination of the screen occurs, but when the sweep commences the sudden rise in voltage in the cathode of $V_3$ applied to the grid of the cathode ray tube gives the required "bright-in" during the sweep period only.

It will be understood that the invention may take other forms. Among the possible modifications of the arrangement shown in the drawing are the insertion of a buffer valve amplifier between V1 and V3; and again the use of a hard-valve limiter in the cathode circuit of V3 instead of the neon tube N1. It is convenient to have a differentiating circuit followed by an amplifier with a low output impedance, for use with this time-base as the input impedance to the grid circuit of the triggering valve V3 is preferably kept low, and control over the shape and amplitude of the triggering signal helps to obtain optimum results.

What is claimed is:

1. A time base circuit responsive to trigger pulses, comprising a normally non-conductive electron discharge device of the constant-current type having a cathode, an anode and a plurality of grids, a source of space current connected across said anode and said cathode, biasing means maintaining all except one of said grids at fixed potentials relative to said cathode, a condenser inserted between said anode and the positive pole of said source, a first trigger tube connected at its cathode to said anode and shunted across said condenser, said tube being arranged to conduct upon charging of said condenser to a predetermined voltage, a load impedance connected in series with said source and said tube, a second trigger tube having an input and an output circuit, said input circuit being adapted to receive said trigger pulses whereby said second tube will be rendered conductive and result in a change of potential at a point of said output circuit, circuit means connecting said point to said one grid of said electron discharge device so as to apply said change of potential to said one grid with a positive polarity, whereby said discharge device will become conductive and will charge said condenser until said first trigger tube becomes energized and causes a terminal of said load impedance to undergo a change of potential, and a connection coupling said terminal to an electrode of said second tube in such manner that energization of said first tube will quench said second tube, whereby said one grid will be driven sufficiently negative to render said electronic discharge device non-conductive.

2. A time base circuit according to claim 1, further comprising a glow tube connected between said one grid and said cathode so as substantially to prevent the potential of said one grid from exceeding a predetermined value.

3. A time base circuit according to claim 2 wherein said electron discharge device is a pentode and said one grid is the screen of said pentode.

4. A time base circuit responsive to trigger pulses, comprising a vacuum tube of the constant-current type having a cathode, an anode, and a plurality of grids including a screen grid, a source of space current connected across said anode and said cathode, a condenser inserted between said anode and the positive pole of said source, a first gas discharge tube connected at its cathode to said anode and arranged to be ionized by an anode-cathode voltage less than the voltage of said source, a load resistance inserted between the positive pole of said source and the anode of said first gas discharge tube, a second gas discharge tube having an input circuit adapted to receive said trigger pulses whereby said second tube will be rendered conductive, said second tube further having an output circuit including an anode resistance and a cathode resistance connected, respectively, to the positive and the negative pole of said source, a conductive connection between said screen grid and a point on said cathode resistance, biasing means maintaining all the grids of said vacuum tube except said screen grid at such fixed potentials relative to the cathode of said vacuum tube as to maintain said vacuum tube non-conductive in the de-ionized condition of said second gas discharge tube and conductive in the ionized condition of the latter tube, said vacuum tube when conductive being arranged to charge said condenser at a substantially linear rate until said first gas discharge tube becomes ionized, whereupon said condenser discharges through said first tube and produces a voltage drop across said load resistance, and circuit means coupling the anodes of said two gas discharge tubes together whereby said voltage drop will lower the anode potential of said second tube sufficiently to quench the latter.

5. A time base circuit according to claim 4 wherein said first gas discharge tube has a control grid, further comprising a source of adjustable bias for said control grid whereby the period of conductivity of said vacuum tube and of said second gas discharge tube may be varied.

6. In combination, a cathode ray tube having deflecting elements and an intensity control electrode normally biased to suppress the beam of said tube; a time base circuit connected across said deflecting elements, said time base circuit comprising a condenser, a normally non-conductive constant-current device connected in series with said condenser, means including a trigger circuit responsive to incoming pulses for rendering said device conductive whereby said condenser will be charged at a substantially linear rate, a normally blocked discharge device connected across said condenser with such a polarity as to discharge said condenser when the voltage across the latter reaches a predetermined value, means including said discharge device for restoring said constant-current device to non-conductive condition upon discharge of said condenser, and a load impedance connected in said time base circuit so that a voltage drop is produced across said impedance when said constant-current device is conductive; and circuit means coupling said load impedance to said intensity control electrode in such a manner that said voltage drop will overcome the bias of said intensity control electrode sufficiently to cause the appearance of said beam when said constant-current device is conductive.

7. In combination, a cathode ray tube having deflecting elements and an intensity control electrode normally biased to suppress the beam of said tube, a time base circuit according to claim 1, first output means arranged to apply the alternating voltage built up across said condenser to said deflecting elements, and second output means arranged to apply at least part of the potential of said one grid to said intensity control electrode in such manner that the latter electrode will be biased sufficiently positive to cause the appearance of said beam when said electron discharge device is conductive.

8. In combination, a cathode ray tube having a pair of deflecting electrodes and an intensity control electrode normally biased to suppress the beam of said tube, a time base circuit according to claim 4, first output means connecting said constant-current device across said deflecting electrodes, and second output means connecting a tap on said cathode resistance to said intensity control electrode, the potential of said tap in the ionized condition of said second gas discharge tube being sufficiently positive to cause the appearance of said beam.

ROY HILTON.

REFERENCES CITED

The following references are of record in the file of this patent:

UNITED STATES PATENTS

| Number | Name | Date |
|---|---|---|
| 2,085,100 | Knowles et al. | June 29, 1937 |
| 2,102,951 | Hackenberg | Dec. 21, 1937 |
| 2,114,938 | Puckle | Apr. 19, 1938 |
| 2,147,559 | Schlesinger | Feb. 14, 1939 |
| 2,155,210 | Young | Apr. 18, 1939 |
| 2,244,013 | Knoop | June 3, 1941 |
| 2,244,513 | Burton | June 3, 1941 |
| 2,295,293 | Rogers | Sept. 8, 1942 |
| 2,385,736 | Smith et al. | Sept. 25, 1945 |
| 2,413,063 | Miller | Dec. 24, 1946 |

FOREIGN PATENTS

| Number | Country | Date |
|---|---|---|
| 540,218 | Great Britain | Oct. 9, 1941 |

Certificate of Correction

Patent No. 2,476,978                                      July 26, 1949

ROY HILTON

It is hereby certified that errors appear in the above numbered patent requiring correction as follows:

In the grant, line 15, strike out the words "of seventeen years"; same line, after "grant" insert *until February 3, 1964*; in the heading to the printed specification, line 10, before "8 Claims" insert *Section 1, Public Law 690, August 8, 1946. Patent expires February 3, 1964*;

and that the said Letters Patent should be read with these corrections therein that the same may conform to the record of the case in the Patent Office.

Signed and sealed this 11th day of July, A. D. 1950.

[SEAL]

THOMAS F. MURPHY,
                                                   *Assistant Commissioner of Patents.*